United States Patent [19]
Kumagai et al.

[11] 3,825,802
[45] July 23, 1974

[54] SOLID CAPACITOR

[75] Inventors: Henry Yasuo Kumagai, Lower Macungie Township, Lehigh County, Pa.; Hugh Morris McKnight, Lewisville, N.C.

[73] Assignee: Western Electric Company Incorporated, New York, N.Y.

[22] Filed: Mar. 12, 1973

[21] Appl. No.: 340,518

[52] U.S. Cl. ............................................. 317/230
[51] Int. Cl. ............................................. H01g 9/05
[58] Field of Search ................................... 317/230

[56] References Cited
UNITED STATES PATENTS
3,308,350 3/1967 Smyth et al. ....................... 317/230
3,723,838 3/1973 Kumagai ............................ 317/258

*Primary Examiner*—Rudolph V. Rolinec
*Assistant Examiner*—William D. Larkins
*Attorney, Agent, or Firm*—J. Rosenstock

[57] ABSTRACT

An improved solid capacitor is disclosed. The capacitor comprises a porous body of compressed particles of a film-forming metal suitably doped with a dopant selected from the group comprising N, Si, P, B and mixtures thereof. An electrolytically formed dielectric oxide film of the film-forming metal covers the exposed surface of each of the particles. Impregnating the body and in intimate contact with the dielectric film is a layer of manganese dioxide. A layer of graphite overlies the layer of manganese dioxide and a metal casing encompasses the major portion of the body which is insulated therefrom and in electrical contact with the layer of graphite. Electrical lead means are attached to the porous body and the casing.

8 Claims, 3 Drawing Figures

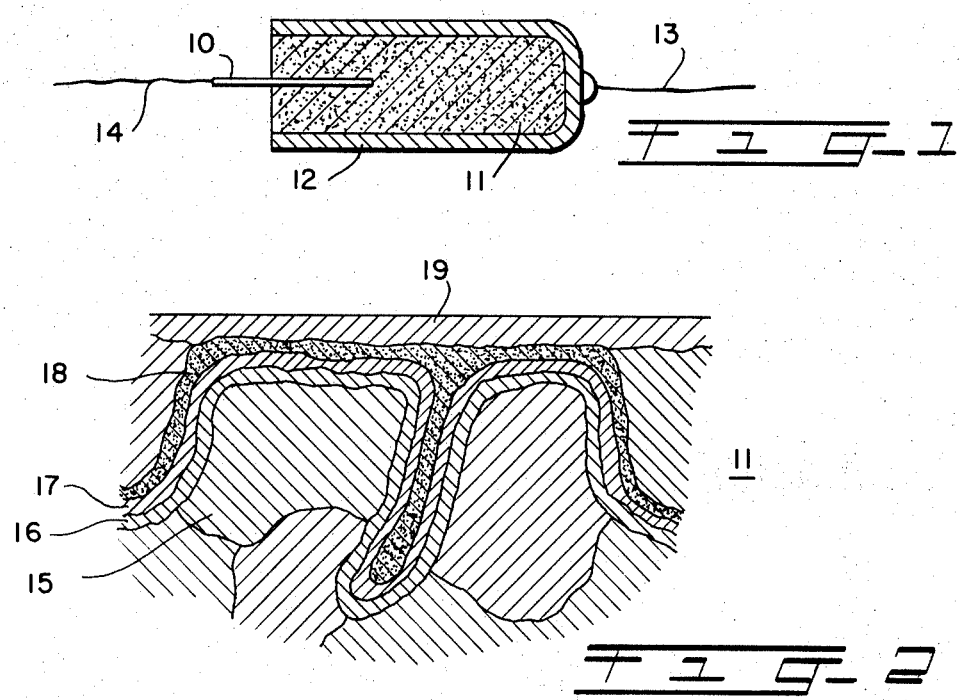
FIG. 1
FIG. 2
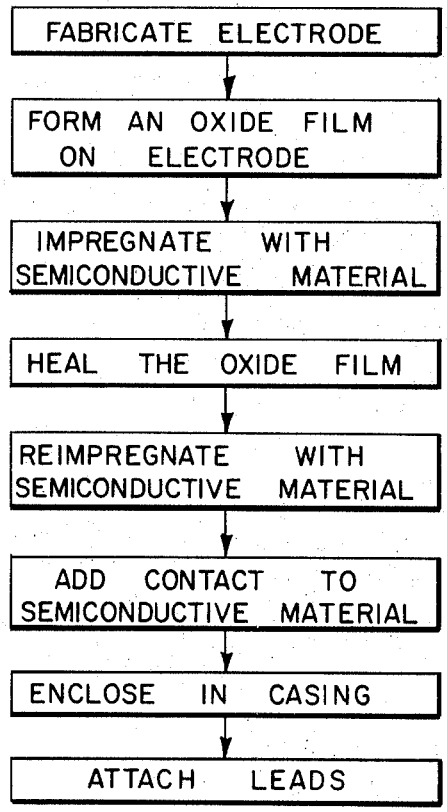
FABRICATE ELECTRODE
↓
FORM AN OXIDE FILM ON ELECTRODE
↓
IMPREGNATE WITH SEMICONDUCTIVE MATERIAL
↓
HEAL THE OXIDE FILM
↓
REIMPREGNATE WITH SEMICONDUCTIVE MATERIAL
↓
ADD CONTACT TO SEMICONDUCTIVE MATERIAL
↓
ENCLOSE IN CASING
↓
ATTACH LEADS
FIG. 3

SOLID CAPACITOR

BACKGROUND OF THE INVENTION

1. Field of the Invention

This invention relates to an improved solid capacitor and more particularly, to an improved solid film-forming metal capacitor comprising a sintered doped film-forming metal electrode.

2. Description of the Prior Art

Generally speaking, the characteristics such as higher specific capacitance, i.e., higher capacitance per unit weight of anode material, lower DC leakage, higher breakdown voltage, improved life stability, etc., are desirable in electrolytic capacitors. Sintered capacitors, e.g., tantalum capacitors, have recently come into wide use owing to such comparatively favorable characteristics. However, in order to obtain much higher breakdown voltage and improved life stability as well as other improved characteristics, there is still much room for improvement.

Sintered anode film-forming metal capacitors, such as tantalum capacitors, as is well known, are manufactured by compressing metal powder to form a pellet, sintering a so compressed pellet in a vacuum sintering furnace to form a porous body, and subjecting it to anodization in a proper electrolyte, for instance, a diluted phosphoric acid solution to form a continuous dielectric oxide film on the sintered body.

High purity tantalum powder (99.80 percent pure) is an excellent material for solid or discrete capacitors. It has been found, however, that even a less pure tantalum material (99.75 percent pure) having a suitable dopant contained therein permits even further improvement in the resultant solid or discrete tantalum capacitors. Suitable dopants include nitrogen, silicon, phosphorus and boron.

Doping with a dopant such as nitrogen (nitrogen doping), etc., refers to combining nitrogen atoms with atoms of a film-forming metal, e.g., tantalum atoms, to form a crystalline structure, e.g., body-centered cubic tantalum structure, having the nitrogen atoms interstitially incorporated therewith or therein.

Doping of thin-film capacitors, e.g., beta tantalum capacitors, with dopants such as nitrogen has been accomplished. In this regard, reference is made to H. Y. Kumagai, U.S. Pat. application Ser. No. 217,876, assigned to the assignee hereof. Also sputtering of tantalum thin-film capacitors in the presence of nitrogen and carbon has also been accomplished. In this regard, see U.S. Pat. No. 3,664,931. However, it must be pointed out that the preparation of thin-film capacitors is not comparable to the fabrication of discrete or solid capacitors. Thin-film capacitors are formed by sputtering at low temperatures, e.g., typically at a temperature below 500°C, whereas in solid tantalum capacitor fabrication sintering temperatures of about 1,700° to 2,100°C are typically employed. Therefore, due to the differences in temperature one would expect the following:

a. differences in the reactions between dopants, impurities and base materials;

b. that the dopant, e.g., nitrogen, would not remain in the resultant structure in the manner observed for nitrogen doped beta tantalum thin films (see application Ser. No. 217,876); and c. that the dopant, e.g., nitrogen, would not behave analogously in a solid body-centered cubic tantalum capacitor to that observed in a thin-film capacitor sputtered in the presence of nitrogen, for example, c.f. U.S. Pat. No. 3,664,931. In summary, the mere fact that beneficial doping of a thin-film capacitor is attained does not lead to doping a solid capacitor which is an entirely different structure and is fabricated in an entirely different manner.

SUMMARY OF THE INVENTION

This invention relates to an improved solid capacitor and more particularly, to an improved solid film-forming metal capacitor comprising a sintered doped film-forming metal electrode.

Briefly, the improved solid capacitor comprises a porous body of compressed particles of a film-forming metal, e.g., Ta, doped with a dopant selected from the group comprising N, Si, P, B and mixtures thereof. An electrolytically formed dielectric oxide film of the film-forming metal covers the exposed surface of each of the particles. Impregnating the body and in intimate contact with the dielectric film is a layer of manganese dioxide. A layer of graphite overlies the layer of manganese dioxide and a metal casing encompasses the major portion of the body which is insulated therefrom and in electrical contact with the layer of graphite. Electrical lead means are attached to the porous body and the casing.

DESCRIPTION OF THE DRAWINGS

The present invention will be more readily understood by reference to the following drawings taken in conjunction with the detailed description, wherein:

FIG. 1 is a diametrical sectional view of a cylindrical capacitor embodying this invention;

FIG. 2 is a magnified view of a fragmentary surface portion of the embodiment of FIG. 1; and FIG. 3 is a diagrammatic representation of the method of this invention.

DETAILED DESCRIPTION

Referring now to FIG. 1, there is a sectional view of a capacitor embodiment of the present invention, including a solid tantalum wire 10, one end of which is embedded in a porous body 11. Overlying the external surface of the completed unit is a conducting coating or casing 12, e.g., a sprayed copper or melted-on lead-tin solder. A suitable lead 13 is attached, e.g., by soldering, to the conducting coating 12. A similar lead 14 is attached, e.g., by welding, to the solid tantalum wire 10.

Illustrated in FIG. 2 is the detailed composition of the porous body 11 of FIG. 1. Referring to FIG. 2, the body 11 includes a porous electrode 15 of a film-forming metal, doped with a suitable dopant. By film-forming metal is meant a metal capable of electrolytically forming a dielectric film on its surface when made anodic in an electrolytic solution. This class of metals includes tantalum, aluminum, tungsten, columbium, hafnium, titanium and zirconium. A suitable dopant is one selected from the group comprising nitrogen, silicon, phosphorus, boron and mixtures thereof. By the term doped film-forming metal is meant a combination of the atoms of the film-forming metal, e.g., tantalum, and the dopant atoms, e.g., nitrogen, forming a crystalline structure having dopant atoms, e.g., nitrogen, interstitially incorporated therewith or therein. In the case of tantalum doped with nitrogen it is postulated that a bulk or body-centered cubic structure is formed having nitrogen interstitially incorporated therewith or therein.

The dopant, e.g., N, Si, etc., is present in the resultant electrode 15, e.g., a tantalum electrode, in an effective amount, ranging from a minimum, which is more than an incidental impurity concentration, to a maximum that improves the properties of the resultant capacitor, e.g., voltage breakdown, storage energy of a capacitor, etc., as compared to those capacitors having an undoped porous electrode. Such a concentration of dopant is easily ascertained by one skilled in the art, without an undue amount of experimentation, in the light of the disclosure contained herein. In the case of a porous tantalum electrode 15, a typical concentration for nitrogen doping ranges from 0.47 to 2.71 atomic percent. It must be understood and stressed, however, that such a nitrogen concentration in tantalum is exemplary only and not limiting and that lesser or greater concentrations of nitrogen may be incorporated in the resultant electrode 15 whereby improved capacitor properties result. In this regard, it must also be pointed out that the nitrogen dopant concentration is merely exemplary for tantalum and is not limiting with respect to the other dopants and the other film-forming metals.

Upon the entire surface of the porous electrode 15, an electrolytically formed anodic or dielectric oxide film 16 is present. For tantalum electrodes (solid) the film may vary in thickness up to about 5,000A units, the exact thickness being directly proportional to the voltage at which the dielectric film was formed. In this particular embodiment, the anodic film is about 2,000A units thick. The filmed porous electrode or anode is coated and impregnated with a layer 17 of semiconductive material, such as the higher oxides of lead, nickel or manganese, in intimate contact with the film 16. Semiconductive materials which may be utilized successfully in carrying out this invention are the semiconductive higher oxides of metals which may be deposited as the product of pyrolytic decomposition of a compound of the metal. The semiconductive material constitutes a solid electrolyte counterpart of the liquid electrolyte of the conventional electrolytic capacitor known in the art.

The porous electrode 15, film 16, and semiconductive layer 17 are also coated and impregnated with a deposit 18 of a good conducting material such as graphite, overlying the semiconductive layer 17. The deposit 18 of conducting material is the counterpart of the cathodic element or can of the conventional electrolytic capacitor known in the art. In order to facilitate electrical connection to the conducting deposit 18, a sprayed or melted-on metal casing 19 encompasses the major portion of the exterior of the porous body 11 in contact with the conducting deposit 18.

Tantalum solid electrolytic capacitors are fabricated by the method illustrated by the block diagram of FIG. 3. The porous electrode 15 is produced by compressing and sintering particles of a mixture, comprising a film-forming metal, e.g., tantalum, and particles of a suitable dopant containing material, e.g., TaN, until the particles are bonded into a rigid porous mass. It is to be noted that the sintering is carried out at a temperature, typically 1,700° to 2,100°C for a period of time, typically 30 minutes, sufficient to diffuse the dopant, e.g., nitrogen, throughout the porous mass and to fuse the particles together. It is also to be noted that the above is the preferred method of obtaining a rigid porous mass of tantalum doped with nitrogen. The use of TaN powder is an efficient expedient, however, it must be pointed out that the introduction of dopant material is not to be limited thereby. Dopant material may be combined with the particular film-forming metal employed, prior to or during the sintering operation, in the form of a solid, e.g., TaN, elemental Si, etc., a liquid, e.g., an aqueous $NH_4OH$ solution, or a gas, e.g., $SiH_3$, $NH_3$, $N_2$, etc. In the same step the solid wire 10 of the same metal, e.g., a tantalum wire, is bonded to the mass, with one end embedded within the porous body.

An advantageous shape for the porous electrode 15 is that of a cylinder, however, the invention is not limited to any particular shape. The porous electrode 15 may be cleaned if necessary by any one of a number of conventional cleaning methods well known in the art. The clean porous electrode 15 is immersed in an electrolytic solution supported by the solid wire 10, e.g., tantalum wire, through which a positive DC anodization current is applied. A sheet of tantalum immersed in the anodizing solution is a suitable cathode. The electrolyte used may be either an aqueous solution, e.g., 0.4 volume percent aqueous nitric acid, 0.1 volume percent aqueous phosphoric acid, or a fused salt electrolyte, e.g., a eutectic mixture of sodium nitrate and sodium nitrite in equal parts by weight, a mixture of 64 percent potassium nitrate − 36 percent lithium nitrate, by weight, a mixture of 54 percent potassium nitrate − 30 percent lithium nitrate − 16 percent sodium nitrate, by weight.

Upon the passage of a positive DC current through the porous electrode 15, e.g., a nitrogen doped tantalum electrode, and the electrolyte, the anodic film 16 of an oxidation product of doped film-forming metal, e.g., nitrogen-doped tantalum oxide, is formed giving evidence of its physical presence by a brilliant interference color which changes as the film increases in thickness. Film formation is conducted in accordance with established electrolytic practice until a film of the desired voltage and leakage current characteristics has been obtained. The thickness of the anodic oxide film and hence the capacitance is determined by the DC anodizing potential, which is nominally three to five times the voltage rating of the capacitor, typically ranging from 18 to 260 volts yielding a thickness of 300 to 4,350A. A suitable method of forming the anodic or dielectric oxide is to apply constant DC current of sufficient magnitude, e.g., 8.9 micro-amperes per microfarad volt to give the desired rate of anodic oxide film formation, e.g., 33.4A/min., until the desired formation potential is obtained. The DC formation potential is applied for several hours, e.g., typically four hours.

After formation of the anodic film 16, the porous electrode 15 is removed from the liquid electrolyte and immersed in an aqueous solution of manganous nitrate until the electrode is thoroughly impregnated with the solution. The solution impregnating the electrode 15 is then pyrolytically converted at a temperature sufficient to decompose the manganous nitrate and convert it to manganese dioxide, e.g., 250°C, for a period of a few minutes, e.g., 1 to 4 minutes, or at least until all odor of nitrogen products is gone. The step of immersing in the manganous nitrate solution and converting it to manganese dioxide is repeated two or three times to insure a thorough impregnation. Upon subjection to the temperature required to convert the manganous nitrate to manganese dioxide, gaseous products including oxides of nitrogen are given off, leaving minute openings into the interior of the porous electrode assembly.

The electrode assembly, including the porous electrode 15, anodic film 16 and layer 17 of manganese dioxide, in contact with the anodic film, is then replaced in the electrolyte and anodized again at approximately one half the original forming voltage for about thirty minutes. This step anodically heals imperfections in the oxide film and reduces the leakage current to a point of usefulness for the capacitor.

The semiconductive oxide, e.g., $MnO_2$, overlies the anodic film 16 and is in contact with substantially all of the residual imperfections in that film. It is believed that a semiconductor such as manganese dioxide, when subjected to the high fields prevailing in the healing process, acts at its surface as an ionic conductor providing oxygen for film formation on either the film-forming anode or impurities contained thereon. The semiconductor in the process undergoes reduction at its surface to form an insulating barrier.

After the step of anodically healing imperfections, the electrode 15 is further impregnated with manganous nitrate, which is then converted pyrolytically in the same manner as the previous impregnation to manganese dioxide. The second application of manganese dioxide not only thickens the coating of this semiconductor but also replaces these portions of the original coating which were reduced in the process of repairing residual flaws. Several coats of $MnO_2$ are applied in this manner to the anode assembly, followed by re-anodizing after each three or four coats. This cycle is repeated until typically eight to twelve coats have been applied to form layer 17.

The further impregnated electrode assembly is then impregnated with the conducting deposit 18, as by immersing the unit in an aqueous suspension of graphite, followed by air drying and/or heating, e.g., at 135°C, of the unit to drive off water. The assembly is then suspended from the solid wire 10, e.g., a tantalum wire, and the metal coating or casing 19 is sprayed or melted or solder dipped onto the cylindrical surface. Suitable leads are attached to the solid wire 10, e.g., tantalum wire, and the external casing formed. The solid wire lead 10, of course, must be electrically insulated from the external casing. The capacitor may be suitably finished by coating the surface with lacquer or injection molding with epoxy.

Capacitors in accordance with this invention are constructed of dry essentially inorganic materials forming a compact rigid body of extremely high electrical charge storage capacity per unit volume. The semiconductive material 17 in intimate contact with the dielectric anodic film 18 is an electronic conductor which is capable of reacting ionically at its surface as does the liquid electrolyte in a conventional electrolytic capacitor. The solid semiconducting layer 17 is in intimate contact with the filmed anode 15 similar to liquid electrolytes. In this solid electrolytic capacitor the healing of breaks in the anodic film is accomplished by subjecting the filmed anode impregnated with semiconductor to re-anodizing, e.g., in an electrolytic solution or in a fused salt bath, followed by re-impregnation. The step of healing the anodic film and re-impregnating with the semiconductive material includes in the manufacture certain of the characteristics of the conventional electrolytic capacitor, particularly, the ability to re-form breaks in the anodic film. In so doing, the semiconductive material, e.g., $MnO_2$, also is capable of functioning as an electrolyte which supplies oxygen for the repair of imperfections in the oxide film, e.g., N-doped tantalum oxide.

EXAMPLE I

For comparison purposes, 400 solid undoped tantalum capacitors were fabricated. High purity (99.80 percent pure) tantalum powder (65 percent less than −325 mesh size) commercially obtained, was mixed with a commercially obtained wax binder and was pressed and compacted into 400 cylindrically shaped anode structures having the following characteristics:

a. anode weight = 0.73 grams (including 3 weight percent of the wax binder);
b. length = 0.286 inches;
c. diameter = 0.160 inches; and
d. density = 7.7 gms./cm$^2$.

A 0.25 inch diameter tantalum wire of high purity (99.9 percent minimum purity) was imbedded in one end of each of the cylindrical anode structures during compacting. The wax binder served to hold each structure together.

Each anode structure was then fired at about 900°C under vacuum ($1.0 \times 10^{-2}$ torr) for about 10 minutes at this temperature to remove the wax binder and to partially sinter the particles of the tantalum powder together. This was followed by a final vacuum sintering (less than $1.0 \times 10^{-4}$ torr) at a temperature of about 1,900°C for 30 minutes at this temperature.

The resultant sintered tantalum anodes were then welded by their wire leads to stainless carrier bars (100 parts/bar) for processing and testing. The sintered anodes were suspended in 0.4 volume percent aqueous nitric acid, maintained at 60°C, and anodized at an anodizing voltage of 118 volts for 240 minutes to form a dielectric film comprising an oxide of tantalum. The tantalum oxide film was 1,970A thick. The anodized anodes were then impregnated with a 1.58 specific gravity aqueous manganous nitrate solution. The manganous nitrate solution impregnating the anodes were pyrolytically converted to $MnO_2$ by heating in air at about 250°C for 3 minutes. This impregnation was repeated 3 times.

The $MnO_2$ impregnated anode assemblies were suspended in a solution of 0.001 volume percent aqueous nitric acid and re-anodized at 66 volts for 30 minutes. Six additional coats of $MnO_2$ were formed on each anode assembly, as described above (after each 3 coats there was a re-anodization at 66 volts for 30 minutes). Each anode assembly was then impregnated with a conducting deposit of graphite which was air dried and cured at 135°C. Each anode assembly was then dipped into a solution of finely dispersed silver powder in butyl acetate. Each assembly was then air dried and cured at 135°C and a layer of solder applied to the resulting silver coat. A cap and lead assembly was then attached to the solder layer of each unit to provide a cathode connection to each capacitor. A nickel anodic lead wire was then welded to the tantalum anode lead wire which provided anodic connection to each capacitor. Each capacitor assembly was then enclosed in a casing by conventional injection molding with an epoxy molding compound, commercially obtained.

The DC leakage current, capacitance and dissipation factor were measured before and after molding and after stress aging at 52.5 volts DC, at 85°C for 10 hours with a 1,000 ohm resistor in series with each capacitor. The results are listed in Table I below. The shorted and high leakage current (leakage current, $I_L$, greater than $2.0 \times 10^{-6}$ amperes per capacitor with 35 volts DC applied for 30 seconds) were not further tested. A sample of 48 capacitors from each of the carrier bars was selected at random from the remaining parts and placed on accelerated life test at 43.7 volts DC at 85°C for 1,000 hours. A 1⅓ ampere fuse was in series with each capacitor. A fuse blown at any time during the test constituted a failure of the capacitor. The results of this test are listed in Table I below. Also listed in Table I are The results of the various tests are listed below in Table I.

D. The procedure of Example II-A was repeated except that 2.0 weight percent of TaN (1.82 atomic percent nitrogen) was combined with the tantalum metal. The results of the various tests are listed below in Table I.

E. The procedure of Example II-A was repeated except that 2.5 weight percent of TaN (2.27 atomic percent nitrogen) was combined with the tantalum metal. The results of the various tests are listed below in Table I.

F. The procedure of Example II-A was repeated except that 3.0 weight percent of TaN (2.71 atomic percent nitrogen) was combined with the tantalum metal. The results of the various tests are listed below in Table I.

TABLE I

| % TaN | Atomic % N in Ta | Anode Test Results Voltage Breakdown | | | CV ufv/gm | Capacitor Test Results Avg. Leakage Current * | | | C ($\mu f.$) | Capacitor Yield | Life Test Fuse Failures(%) | | Sample Size (No.) |
|---|---|---|---|---|---|---|---|---|---|---|---|---|---|
| | | Avg. | Low | High | | $I_1$ | $I_2$ | $I_3$ | | | 125 Hrs. | 1000 Hrs. | |
| 0 | 0 | 255 | 248 | 261 | 3367 | .18 | .48 | 2.6 | 20.7 | 87.8 | 0 | 10.4 | 48 |
| | | | | | | .17 | .27 | 2.2 | 20.9 | 85.4 | 2.08 | 6.2 | 48 |
| | | | | | | .25 | .32 | 2.3 | 20.9 | 88.9 | 2.08 | 12.5 | 48 |
| | | | | | | .27 | .59 | 2.8 | 21.1 | 77.8 | 2.08 | 6.2 | 48 |
| | | | | | Avg. | .22 | .46 | 2.5 | | 85.0 | 1.56 | 8.8 | |
| 0.5 | 0.47 | 264 | 218 | 318 | 3437 | .17 | .47 | 1.7 | 21.3 | 75.6 | 0 | 0 | 48 |
| | | | | | | .19 | .40 | 2.5 | 21.6 | 81.1 | 0 | 4.16 | 48 |
| | | | | | Avg. | .18 | .43 | 2.1 | | 77.3 | 0 | 2.08 | |
| 1.0 | 0.92 | 274 | 233 | 295 | 3420 | .19 | .83 | 2.9 | 20.9 | 77.8 | 2.08 | 6.22 | 48 |
| | | | | | | .29 | .47 | 4.7 | 21.1 | 87.6 | 0 | 6.22 | 48 |
| | | | | | Avg. | .25 | .65 | 3.8 | | 82.7 | 1.04 | 6.22 | |
| 1.5 | 1.38 | 267 | 247 | 295 | 3452 | .15 | .54 | 4.1 | 20.9 | 81.1 | 0 | 4.16 | 48 |
| | | | | | | .27 | .38 | 4.9 | 21.2 | 84.1 | 0 | 4.16 | 48 |
| | | | | | Avg. | .21 | .46 | 4.5 | | 82.6 | 0 | 4.16 | |
| 2.0 | 1.82 | 264 | 223 | 288 | 3449 | .18 | .30 | 5.4 | 21.3 | 91.1 | 0 | 2.08 | 48 |
| | | | | | | .23 | .38 | 7.9 | 21.5 | 80.0 | 6.24 | 20.80 | 48 |
| | | | | | Avg. | .20 | .34 | 6.6 | | 85.6 | 3.12 | 11.44 | |
| 2.5 | 2.27 | 250 | 207 | 283 | 3460 | .34 | .67 | 11.7 | 21.5 | 77.8 | 2.08 | 18.72 | 48 |
| | | | | | | .21 | .44 | 11.0 | 21.7 | 78.8 | 0 | 4.16 | 48 |
| | | | | | Avg. | .27 | .55 | 11.3 | | 78.4 | 1.04 | 11.44 | |
| 3.0 | 2.71 | 245 | 190 | 280 | 3580 | .24 | .48 | 21.5 | 22.2 | 77.4 | 2.08 | 10.40 | 48 |
| | | | | | | .25 | .45 | 25.0 | 22.7 | 86.4 | 0 | 10.40 | 48 |
| | | | | | Avg. | .25 | .46 | 23.2 | | 81.9 | 1.04 | 10.40 | |

*Avg. Leakage Current after anode lead weld = $I_1$; after stress aging = $I_2$; after Life Tests = $I_3$.

the measured results for average DC leakage current (measured by applying 35 volts DC between the electrodes and measuring the leakage current 30 seconds after the voltage was applied), capacitor yield, life test after 125 hours at 43.7 volts at 85°C and life test after 1,000 hours at 43.7 volts at 85°C.

EXAMPLE II

A. The procedure of Example I was repeated except that 0.5 weight percent of TaN (0.47 atomic percent nitrogen), commercially obtained, was mixed with the tantalum powder to obtain capacitors of the same overall dimensions as in Example I. The results of the various tests are listed in Table I.

B. The procedure of Example II-A was repeated except that 1.0 weight percent of TaN (0.92 atomic percent nitrogen) was combined with the tantalum metal. The results of the various tests are listed below in Table I.

C. The procedure of Example II-A was repeated except that 1.5 weight percent of TaN (1.38 atomic percent nitrogen) was combined with the tantalum metal.

To summarize the above experimental results, the resultant capacitors having a nitrogen dopant incorporated or combined with metallic tantalum show the following improvements:

1. the anode results indicate that the average breakdown voltage increases with doping;
2. the anode results indicate that the stored charge (total charge = capacitance × voltage [$Q = CV$]) increases with increasing amounts of TaN, which is a very important improvement and factor with respect to the fabrication of capacitors life; and
3. reduction in failure rate (improved life of capacitors).

It is to be understood that the above-described embodiments are simply illustrative of the principles of the invention. Various other modifications and changes may be made by those skilled in the art which will embody the principles of the invention and fall within the spirit and scope thereof.

What is claimed is:

1. In an improved capacitor comprising:
   a. a sintered mass of particles of tantalum constituting a porous electrode;

b. a substantially impervious dielectric film of tantalum oxide on the exposed portions of the particles;

c. film maintaining means comprising a higher semiconductive oxide of manganese in intimate contact with the dielectric film; and d. conductive means constituting a second electrode in contact with the film maintaining means, wherein the improvement comprises:

the particles in (a) above comprise tantalum doped with a dopant selected from the group consisting of N, Si, B and mixtures thereof.

2. The capacitor as defined in claim 1 wherein said dopant comprises nitrogen present in an amount ranging from 0.47 to 2.71 atomic percent.

3. The capacitor as defined in claim 1 wherein the dielectric film comprises an oxide of said doped tantalum.

4. The capacitor as defined in claim 3 wherein the dielectric film comprises an oxide of tantalum doped with nitrogen in an amount ranging from 0.47 to 2.71 atomic percent.

5. The capacitor as defined in claim 1 wherein the conductive means comprises a graphite layer and the manganese dioxide is formed in situ by the pyrolytic decomposition of manganous nitrate.

6. In an improved solid tantalum capacitor comprising:

a. a body of compressed particles of tantalum;

b. an electrolytically formed dielectric oxide film of tantalum over the exposed surface of each of the particles;

c. a layer of manganese dioxide impregnating the body and in intimate contact with the dielectric film, the manganese dioxide being reducible in the presence of high fields, the tantalum metal being oxidizable upon the reduction of the manganese dioxide, thereby healing imperfections in the tantalum oxide film;

d. a layer of graphite overlying the layer of manganese dioxide;

e. a metal casing encompassing the major portion of the body insulated therefrom and in electrical contact with the layer of graphite; and f. electrical lead means attached to each of the body and the casing, the improvement comprising:

the compressed particles in (a) above comprise tantalum doped with a dopant selected from the group consisting of N, Si, B and mixtures thereof.

7. The capacitor as defined in claim 6 wherein said dopant comprises nitrogen present in an amount ranging from 0.47 to 2.71 atomic percent.

8. The capacitor as defined in claim 7 wherein the dielectric film comprises an oxide of said doped tantalum.

* * * * *